United States Patent

Wong et al.

Patent Number: 6,119,933
Date of Patent: Sep. 19, 2000

[54] METHOD AND APPARATUS FOR CUSTOMER LOYALTY AND MARKETING ANALYSIS

[76] Inventors: Earl Chang Wong, 10755 Scripps Poway Pkwy., Ste. F-410, San Diego, Calif. 62131; Gordon H. Miles, 1526 Rubenstein Ave., Cardiff, Calif. 92007

[21] Appl. No.: 09/116,654

[22] Filed: Jul. 16, 1998

Related U.S. Application Data

[60] Provisional application No. 60/052,836, Jul. 17, 1997.

[51] Int. Cl.[7] .................................................. G06K 5/00
[52] U.S. Cl. ............................ 235/380; 235/381; 902/27
[58] Field of Search .................................. 235/380, 375, 235/379, 387, 449, 493; 902/3, 4, 27

[56] References Cited

U.S. PATENT DOCUMENTS

| | | | |
|---|---|---|---|
| 4,334,278 | 6/1982 | Marmon | 364/709 |
| 4,678,895 | 7/1987 | Tateisi et al. | 235/379 |
| 4,745,267 | 5/1988 | Davis et al. | 235/379 |
| 4,882,675 | 11/1989 | Nichtberger et al. | 235/381 X |
| 4,993,068 | 2/1991 | Piosenica et al. | 235/380 X |
| 5,056,019 | 10/1991 | Schultz et al. . | |
| 5,101,098 | 3/1992 | Natto | 235/379 X |
| 5,200,889 | 4/1993 | Mori | 364/401 |
| 5,256,863 | 10/1993 | Ferguson et al. | 235/383 |
| 5,594,226 | 1/1997 | Steger | 235/379 |
| 5,877,482 | 3/1999 | Reilly | 235/380 |
| 5,971,272 | 10/1999 | Hsiao | 235/380 |

*Primary Examiner*—Michael G Lee
*Attorney, Agent, or Firm*—Townsend and Townsend and Crew LLP

[57] ABSTRACT

A customer frequency, analysis and reward system has multiple alternative components and allows for input of customer identification through use of a smart card, biometric input device, or a preexisitng identification, such as a credit card, government-issued id, or checking account. A customer interacts with the system initially at a data collection point-of-sale (POS) device at a retail outlet. Data is periodically collected from the retail site to a data warehouse, where various types of analysis may be performed. A customer can interact with the system using an internet interface, thus reducing costs of ownership.

6 Claims, 23 Drawing Sheets

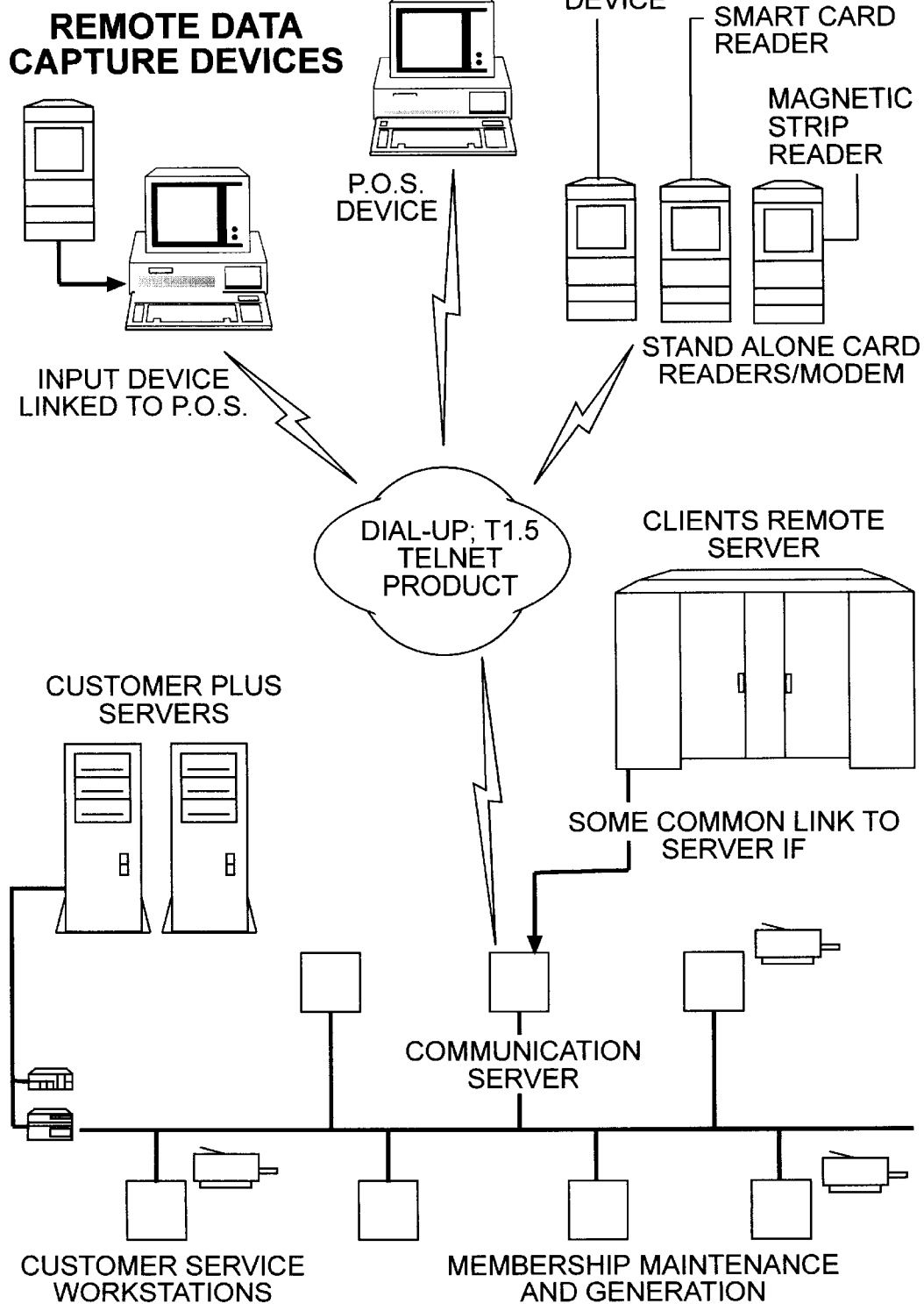

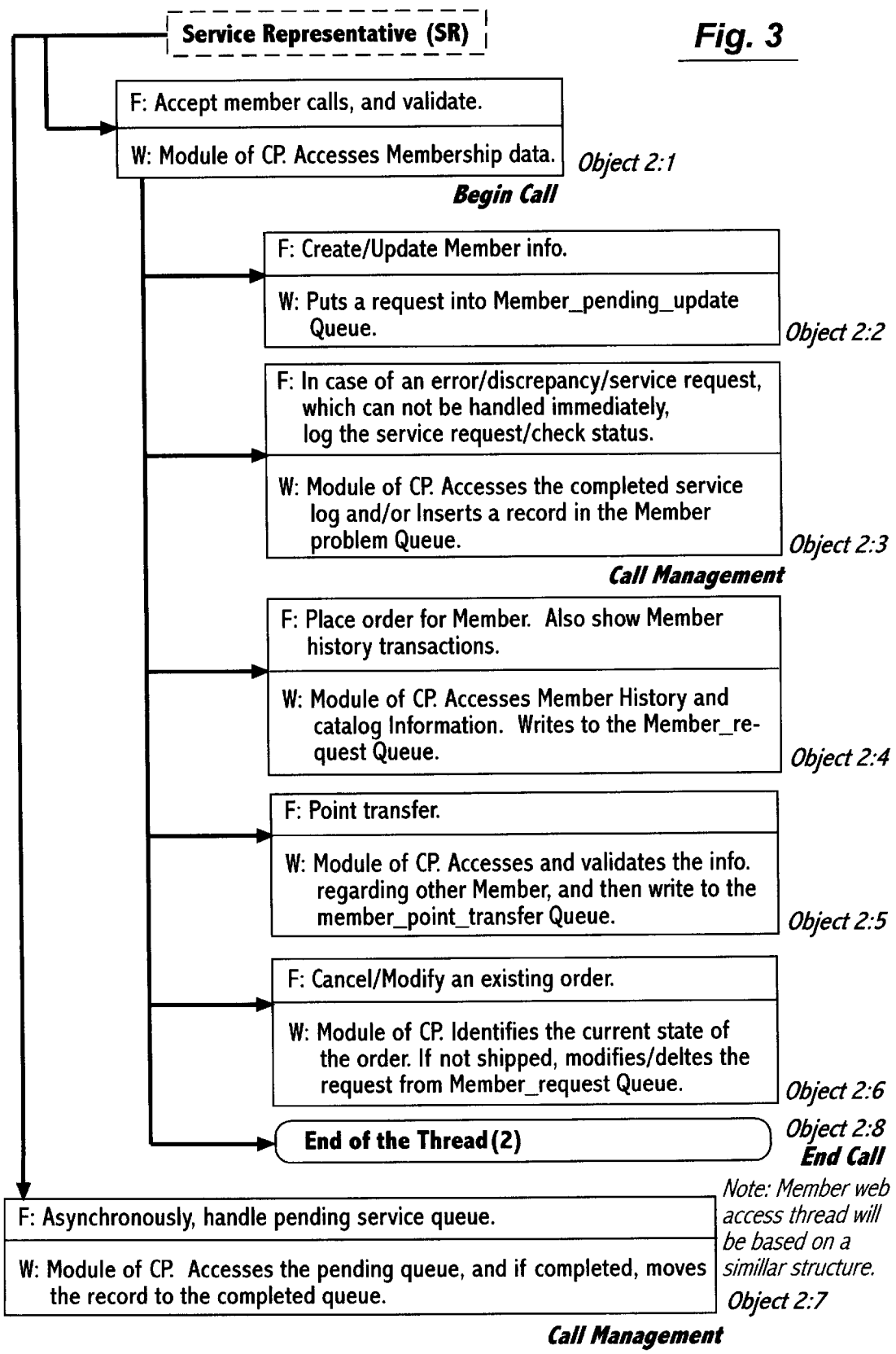

System Architecture Diagram

Customer Plus - ER Diagram (To Fig. 6A)

Fig. 7

File  Log Off  Search  Summary  Update/View  Notes  Preferences  Print Tip Card  Admin  Help

ID [    ]

Name

Last [        ]  First [        ]  Middle [        ]

☐ Include Inactive Members            [ Find ]   [ Sounds Like ]

── Results ──

| Last Name | First Name | Middle Name | Phone | ID |
|---|---|---|---|---|
| Gatlin | Kenneth | Robert | 719-555-1121 | 100-0000 |
| Nance | David |  | 714-555-1188 | 100-0002 |
| OHara | Sheila | L | 714-555-2233 | 100-0001 |

Fig. 8

File  Log Off  Search  Summary  Update/View  Notes  Preferences  Print Tip Card  Admin  Help Name  Title [Mrs]  First [Jennifer]  Middle [M]  Last [Brooks]

Status [Active]  Status Date [11/28/97]  Join Date [11/22/66]

Anniversary [11/22/99]  Birth Date [11/22/88]

Preferences
Server [Mike]
Room [West]
Table [33]

Recient Wine Purchases:
11/07/1997 Cabernet
11/06/1997 Cabernet
11/05/1997 Zin
11/03/1997 Chard
11/02/1997 Cabernet
11/01/1997 Cabernet

Recient Visits

| Date | Sale | Date | Sale |
|---|---|---|---|
| 11/7/97 | 0 | 11/4/97 | 1234 |
| 11/6/97 | 0 | 11/3/97 | 32.25 |
| 11/5/97 | 0 | 11/2/97 | 0 |

YTD Sales [ ]

Defector Status [ ]

File  Log Off  Search  Summary  Update/View  Notes  Preferences  Print Tip Card  Admin  Help ID [100-0001]   Name  Last [OHara]   First [Sheila]   Middle [L]

| Date | Operator | Remarks |
|------|----------|---------|
| 09/15/97 | 123 | This customer asked for his beer warm |
| 10/06/97 | 88 | Note likes his Cabernet on ice |

This customer asked for his beer warm and his Cabernet on ice

[Add New]  [Save]  [Undo]  [Delete]

Fig. 11

File  Log Off  Search  Summary  Update/View  Notes  Preferences  Print Tip Card  Admin  Help

ID  100-0001

| Name | Last | First | Middle |
|------|------|-------|--------|
|      | OHara | Sheila | L |

Item        Preference

Server

Room

Table

Other 1

Other 2

Other 3

Other 4

Other 5

Other 6

Other 7

Save    Undo    Delete

Fig. 12

File  Log Off  Search  Summary  Update/View  Notes  Preferences  Print Tip Card  Admin  Help ID [100-0001]    Name  Last [Brooks]    First [Jennifer]    Middle [M]

| Check Number | Sale    | Server Number | Transaction Amt | Service   |
|--------------|---------|---------------|-----------------|-----------|
| 112233       | 11/7/97 | 333           | 0               | Dinner    |
| 112233       | 11/6/97 | dddd          | 0               | Lunch     |
| 112233       | 11/5/97 | ddd           | 0               | Dinner    |
| 112233       | 11/4/97 | kgatlin       | 1234            | Lunch     |
| 3546         | 11/3/97 | kgatlin       | 32.35           | Breakfast |
| 112233       | 11/2/97 |               | 0               |           |
| 112233       | 11/1/97 |               | 0               |           |

Check Number [ ]   Sale Date [ ]   Server Number [ ]   Check Amt [ ]   Service [ ]

Wine [ ]   Wine Amt [ ]

[New]  [Save]  [Undo]  [Delete]

*Fig. 13*

File  Log Off  Search  Summary  Update/View  Notes  Preferences  Print Tip Card  Admin  Help Store ID        [100]
Store Name  [1234 Main Street]
Address       [Any Town]
City              [Some City]
State           [CA]
Zip              [99999]
Phone         [714-555-1212]
FAX            [714-555-1212]

Import Directory [c:\import]

[Save]

Fig. 14

File  Log Off  Search  Summary  Update/View  Notes  Preferences  Print Tip Card  Admin  Help

| ID | Password | User Name | User Type | Status |
|---|---|---|---|---|
| KRG001 | Kenneth | Kenneth Gatlin | Administrator | Active |
| RR8001 | Brooks | Robert Boorks | Administrator | Active |

User ID

Password

User Name

User Type ▶

Status ▶

[Add New]  [Save]  [Undo]  [Save]

| 1 of 1 | | Total: 4 | | 100% |
|---|---|---|---|---|

Usage Report

| Member | Total Spent | Number of Visits | Avg Amount / Visit |
|---|---|---|---|
| Heavy | | | |
| Gatlin, Kenneth Robert | | | |
| OHara, Sheila L. | | | |
| Total: | | | |
| Light | | | |
| Nance, David | | | |
| Total: | | | |
| Unrated | | | |
| Brooks, Jennifer M. | 1,266.23 | 7 | 180.89 |
| Total: | 1,266.23 | 7.00 | |
| Report Total: | 1,266.23 | 7.00 | |

*Fig. 15*

| 1 of 1 | | | Total: 4 | | 100% |

Birthday Report
Birth Date From 11/22/1933 to 11/22/1999

| Birth Date | Full Name | Total Spent | Number Of Visits | Avg. Amount / Visit |
|---|---|---|---|---|
| Heavy | | | | |
| 11/22/33 | Gatlin, Kenneth Robert | | | |
| | OHara, Sheila L. | | | |
| | Total: | | | |
| Light | | | | |
| 11/22/33 | Nance, David | | | |
| | Total: | | | |
| Unrated | | | | |
| 11/22/33 | Brooks, Jennifer M. | 1,266.23 | 7 | 180.89 |
| | Total: | 1,266.23 | 7.00 | |
| | Report Total: | 1,266.23 | 7.00 | |

*Fig. 16*

| 1 of 1 | | | Total: 4 | | 100% |
|---|---|---|---|---|---|
| Member Join Date Report | | | | | |
| Join Date From 11/22/1933 to 11/22/1999 | | | | | |
| Join Date | Full Name | | Total Spent | Number Of Visits | Avg. Amount / Visit |
| Heavy | | | | | |
| 11/22/44 | OHara, Sheila L. | | | | |
| 11/22/33 | Gatlin, Kenneth Robert | | | | |
| | | Total: | | | |
| Light | | | | | |
| 11/22/33 | Nance, David | | | | |
| | | Total: | | | |
| Unrated | | | | | |
| 11/22/33 | Brooks, Jennifer M. | | 1,266.25 | 7 | 180.89 |
| | | Total: | 1,266.25 | 7.00 | |
| | | Report Total: | 1,266.25 | 7.00 | |

*Fig. 17*

| 1 of 1 | | | | | Total: 7 | | 100% |
|---|---|---|---|---|---|---|---|
| Transaction Log | | | | | | | |
| Sale Date | Full Name | Sale ID | Employee ID | Check Number | Check Amount | Service Type | Wine Amount |
| 11/3/97 | Brooks, Jennifer M. | 3 | kgatlin | 3,546 | 32.25 | Breakfast | |
| 11/4/97 | Brooks, Jennifer M. | 4 | kgatlin | 112,233 | 1,234.00 | Lunch | |
| 11/1/97 | Brooks, Jennifer M. | 1 | | 112,233 | 0.00 | | 22.00 |
| 11/2/99 | Brooks, Jennifer M. | 2 | | 112,233 | 0.00 | | |
| 11/5/99 | Brooks, Jennifer M. | 5 | | 112,233 | 0.00 | | |
| 11/6/99 | Brooks, Jennifer M. | 6 | | 112,233 | 0.00 | | |
| 11/7/99 | Brooks, Jennifer M. | 7 | | 112,233 | 0.00 | | |
| | Report Totals: | | | | 1,266.25 | | |

*Fig. 18*

Print Mailing Labels  [x]

File

Label Type
- ○ Birthday List
- ○ New Members
- ○ Anniversaries
- ● Big Spenders
- ○ Top Spenders Amount Spent [ ]
Top "N" [ ]

*Fig. 19A*

Print Mailing Labels  [x]

File

Label Type
- ● Birthday List
- ○ New Members
- ○ Anniversaries
- ○ Big Spenders
- ○ Top Spenders From [ ]
To [ ]

*Fig. 19B*

| 1 of 1 | | Total: 4 | 100% |
|---|---|---|---|
| Jennifer M. Brooks | David Nance | Sheila L. Ohara | |
| 1 | 2222 Beach BL. | 123 South Street | |
| 2 | Newport Beach | Laguna Niguel | |
| 3 | CA  22222 | CA  12345 | |
| 4      5 | | | |
| | | | |
| Kenneth Robert Gatlin | | | |
| 1111 Main street | | | |
| Laguna Niguel | | | |
| CA  12345 | | | |

*Fig. 20*

METHOD AND APPARATUS FOR CUSTOMER LOYALTY AND MARKETING ANALYSIS

This application claims priority from provisional patent application Ser. No. 60/052,836 filed Jul. 17, 1997 and incorporated herein by reference for all purposes.

SUMMARY OF THE INVENTION

According to the invention, a number of different components may be used together to create a customer frequency, analysis and reward system that has a number of advantages over prior art systems. A system according to the invention may not incorporate all of the different components described below, but may use a subset of the components based on the particular desires or needs of the user employing the system.

According to one embodiment, a customer interacts with the system initially at a data collection point-of-sale POS) device at a retail outlet or other place where a customer interacts with the seller (or user of the system). This POS device may include a magnetic card reader for reading a magnetic stripe on a credit card or other customer loyalty card, or may include a keyboard for entering customer ID information, or may include a check scanner for reading the number of a customer checking account, or may include a biometric input device such as a fingerprint reading technology, or any other device for identifying and validating the identity of a particular customer or group/family of customers.

Once the customer data is read by the POS device, it is compared against a local database which is generally at the retail establishment or quickly accessible to the retail establishment. A match is attempted in the local database from whatever data is collected from the customer. According to one embodiment of the invention, the database will have multiple input points so that a customer does not need to provide a single ID for a loyalty system but the customer's identity may be determined from any of the possible inputs including different credit cards, a number of different checking accounts, a driver's license, or any other ID methodology.

If no match is found in a local database, for example, if it's the first time that a customer is visiting a particular retail outlet, the loyalty system may then check in a second level local database, or may use the Internet or wide area networking technology to attempt a customer ID match in a central database. If no match is found in the local database or the central database, a customer may be invited to provide identifying data at the point of sale so as to join the customer loyalty program. Such invitation may take a form of a mailing card, a computer keyboard input, or an interview conducted by the point-of-sale retail clerk to determine the customer loyalty input data.

According to the invention, furthermore, there may be provided a data warehouse. The function of the data warehouse is to collect all generated customer data on a daily basis and to compile customer profiles about each customer in order to enhance marketing to that customer. External information may be compared against the data warehouse such as demographic data or any other data available about particular customers or groups of customers. A number of analytic tools may be performed to provide meaningful analysis desired by the sellers of their customer profiles, such as identifying spending trends, customer preferences, or the like. In one embodiment of the invention, the central database used for customer validation and the data warehouse are the same database.

According to a further embodiment of the invention, the system keeps track of customer frequency award points in order to encourage customers to participate in the system. A mechanism is provided for customers to directly interact with this customer loyalty system in order to determine their eligibility for awards, or other information, based on their patronage of particular retailers that participate in the customer loyalty system. According to one embodiment, this interface is provided via the World Wide Web over the Internet wherein customers are allowed to interact directly with aspects of the data warehouse, to view their customer information, and to make corrections to such identifying information as telephone numbers and addresses.

According to a further embodiment of the invention, a customer may be given a smartcard, which records customer award points as well as other customer data such as customer preferences or frequency of visits. The invention will be understood better with reference to the following detailed descriptions of the drawings.

BRIEF DESCRIPTION OF THE DRAWINGS

FIG. 1 shows an overview system diagram of one specific embodiment of the invention, with specific variations.

FIG. 3 shows an example of operations and data flow for a customer service workstation operator.

FIGS. 7 through 20 show various specific example input and display screens that can be used to allow a user to interact with the invention.

DESCRIPTION OF SPECIFIC EMBODIMENTS

Overview of a Particular Embodiment of the Invention

There are several distinguishable features of various embodiments of the invention that provide advantages over prior art systems, including the following: (1) Members do not necessarily need a custom membership/private label card; the invention provides a number of different means for identifying customers, including use of a standard credit card swiped and/or keyed; (2) The invention may use OCR and form feeding technology to directly input mailed in forms to the member database; (3) The invention uses automated data warehouse management (communications, inputs, outputs, processing); (4) The invention incorporates point of sale transaction data in its analysis for enterprise level reporting; (5) The invention provides the ability to leverage the Customer Plus knowledge base for enhanced information; (6) The invention encompasses the necessary communication programs, databases, and remote site and host applications for a complete, integrated system; (7) The invention includes predesigned reports for quick and easy presentation of analyses and the flexibility to create ad hoc queries; (8) The invention utilizes the World Wide Web/Internet for maximum visibility and availability and that allows customers to review and update their own information, reducing the cost of ownership of the system;

(9) The invention presents a simple, easy to use set of screens with keyboard and point-and-click control; (10) The invention takes advantage of ADI and zip code/postal standards and provides service bureau consulting for clients and a commercially available software product; and, (11) The invention relies on member selected awards focus (vs. instant awards).

Figure 2A:
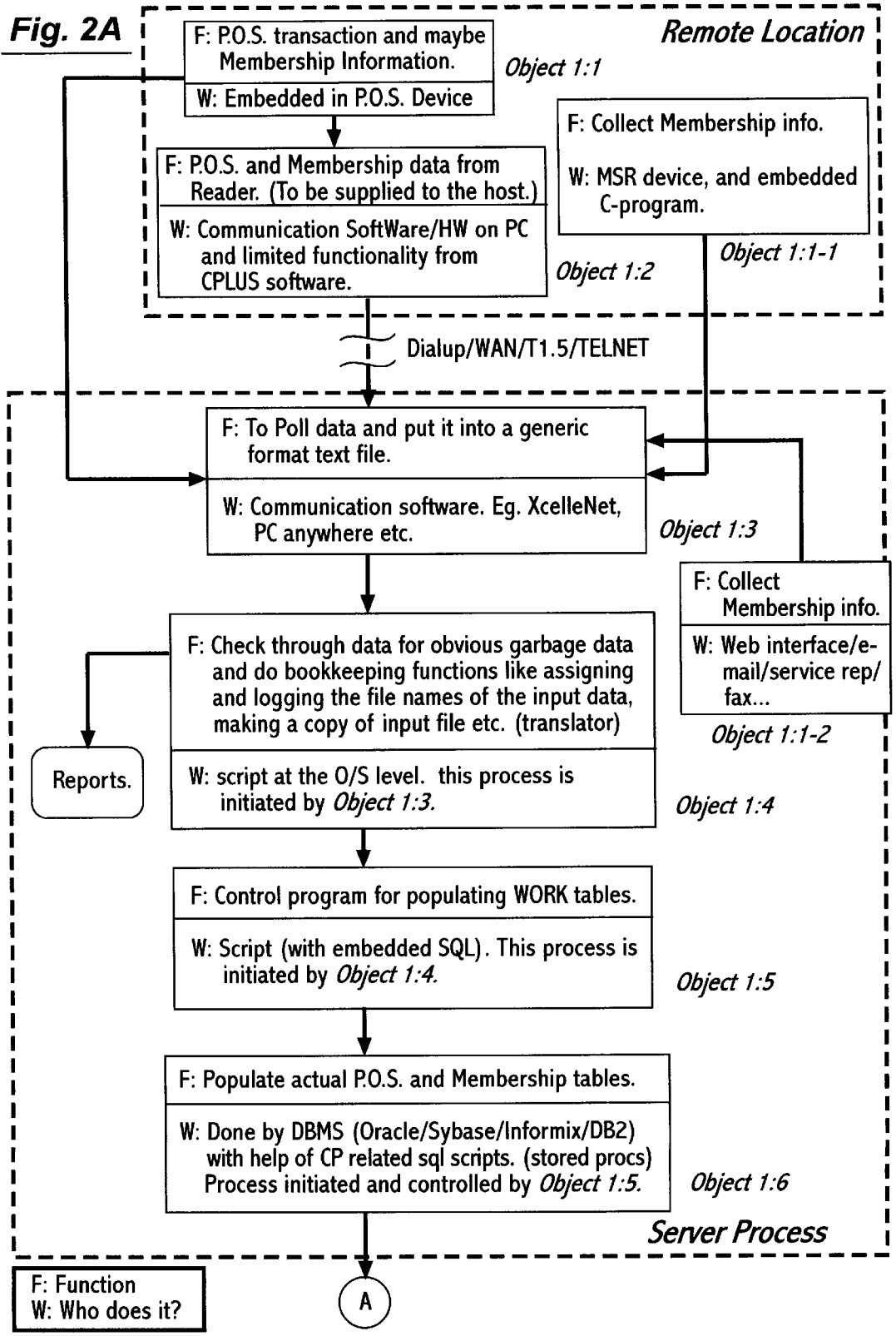
FIGS. 2A and 2B show an example of operations and data flow for a system such as that shown in FIG. 1.
Figure 2B:
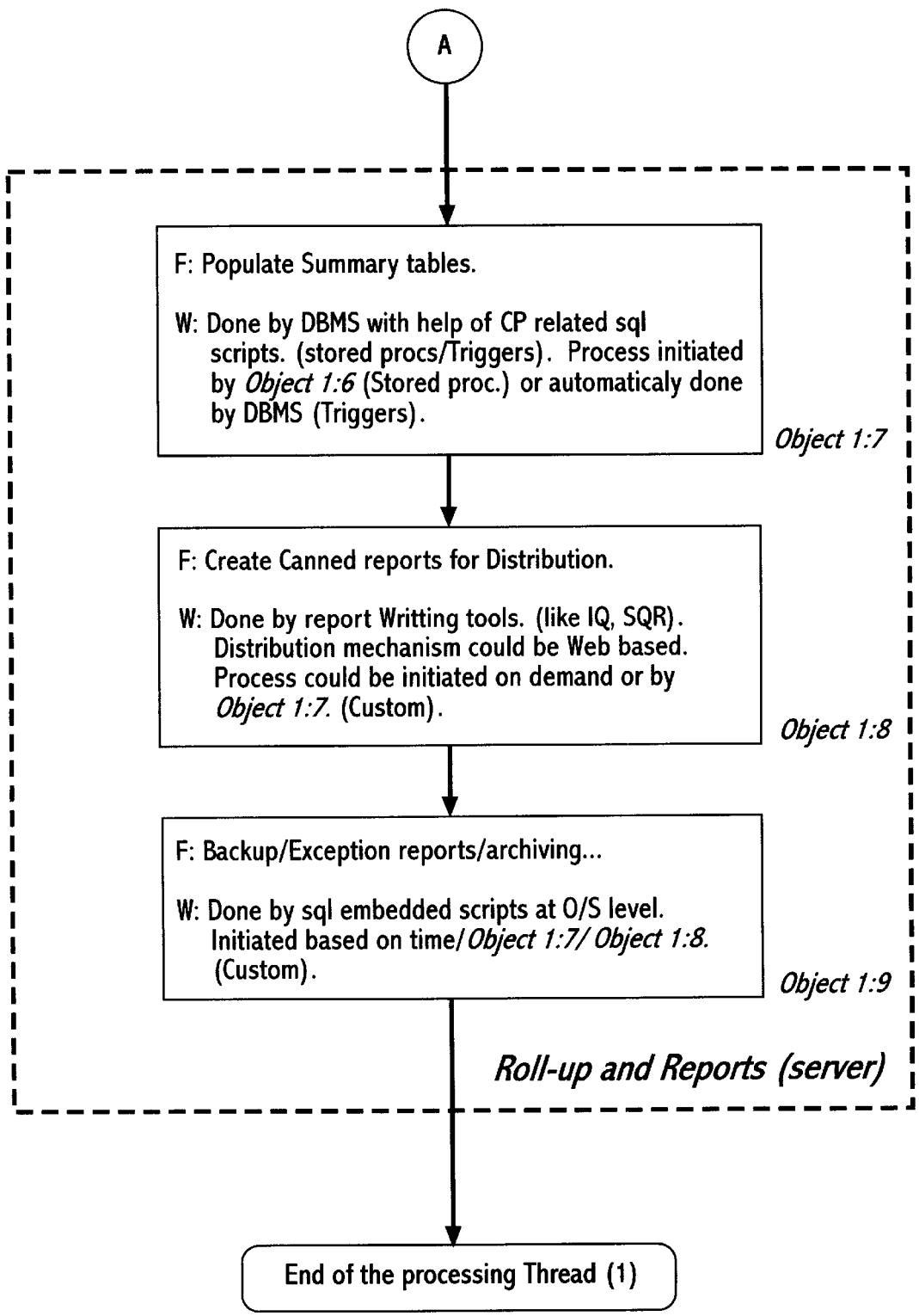
Figure 4:
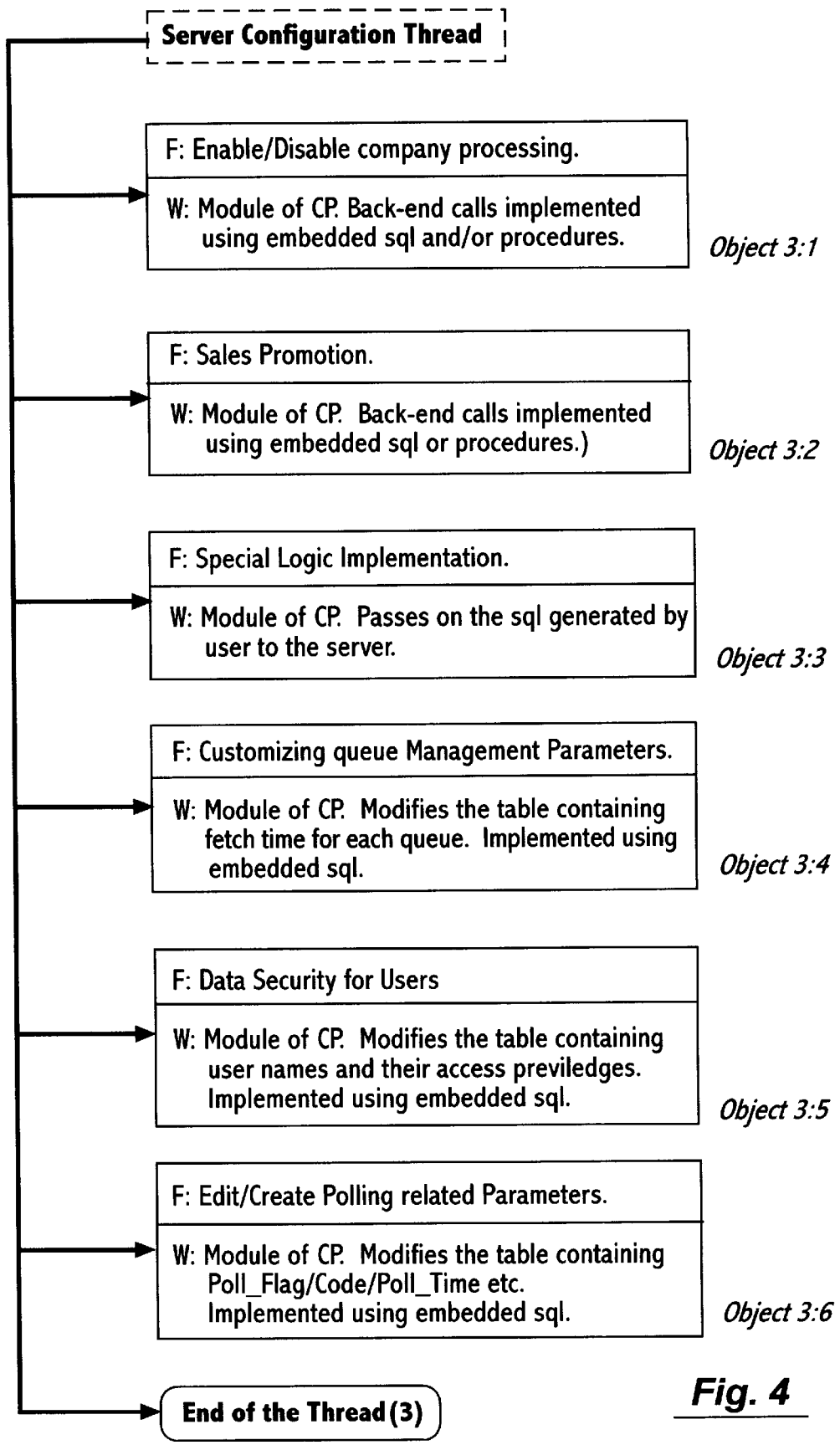
FIG. 4 shows an example of operations and data flow at a server.
Figure 5:
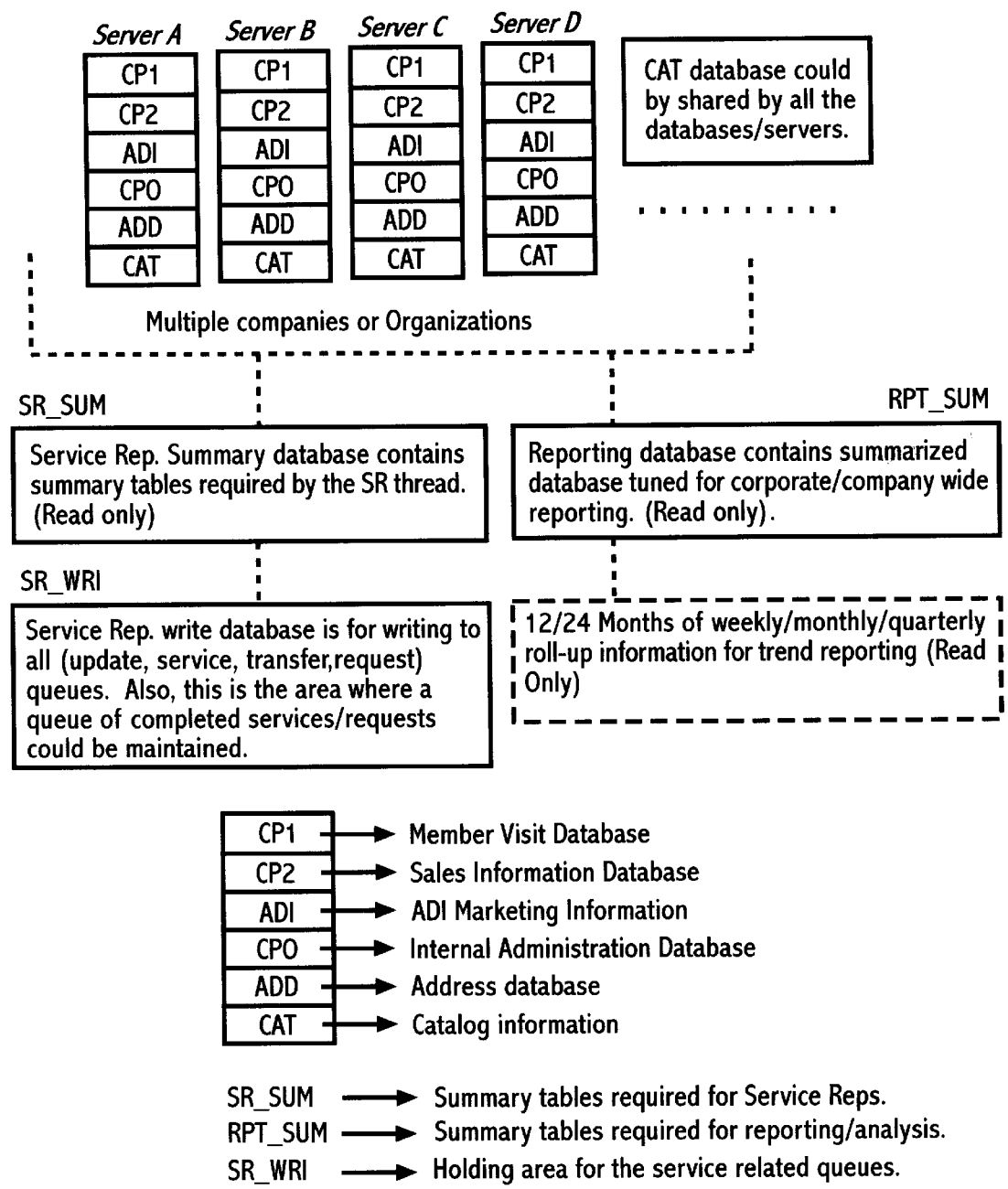
FIG. 5 shows an example database architecture for a high-end client on the service side.
Figure 6A:
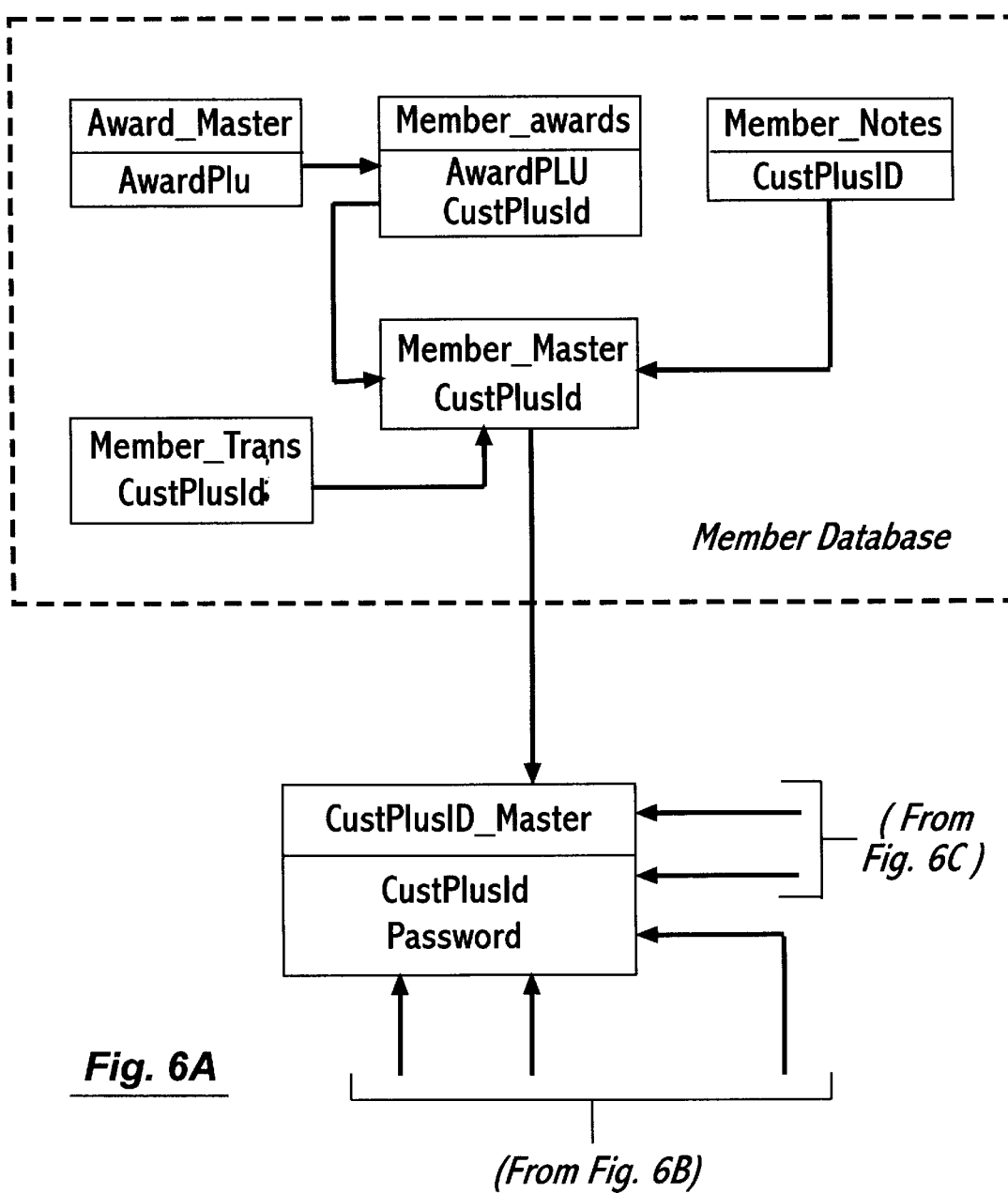
FIG. 6 shows an overview system architecture of a remote customer plus system according to a specific embodiment of the invention.
Figure 6B:
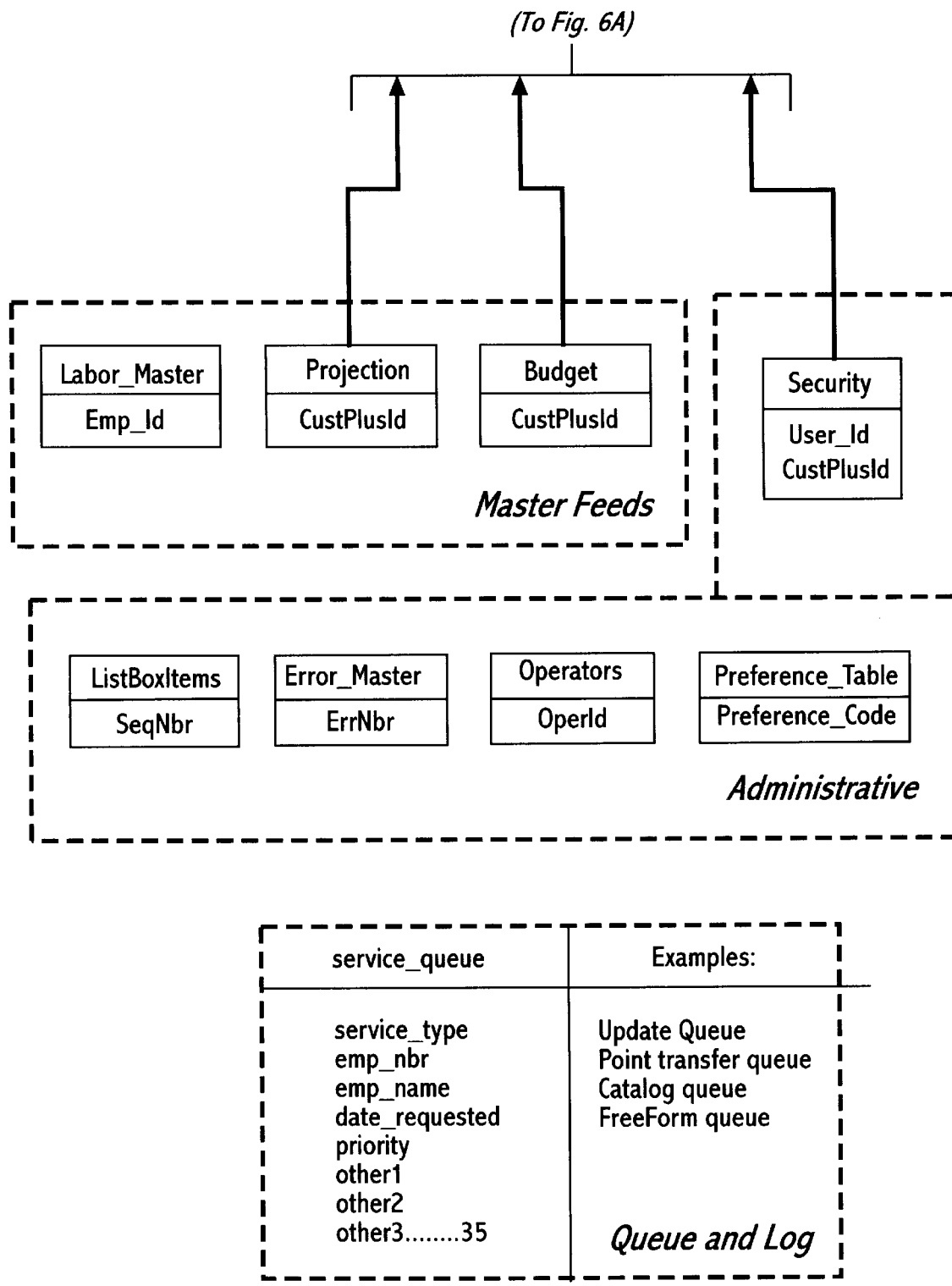
Figure 6C:
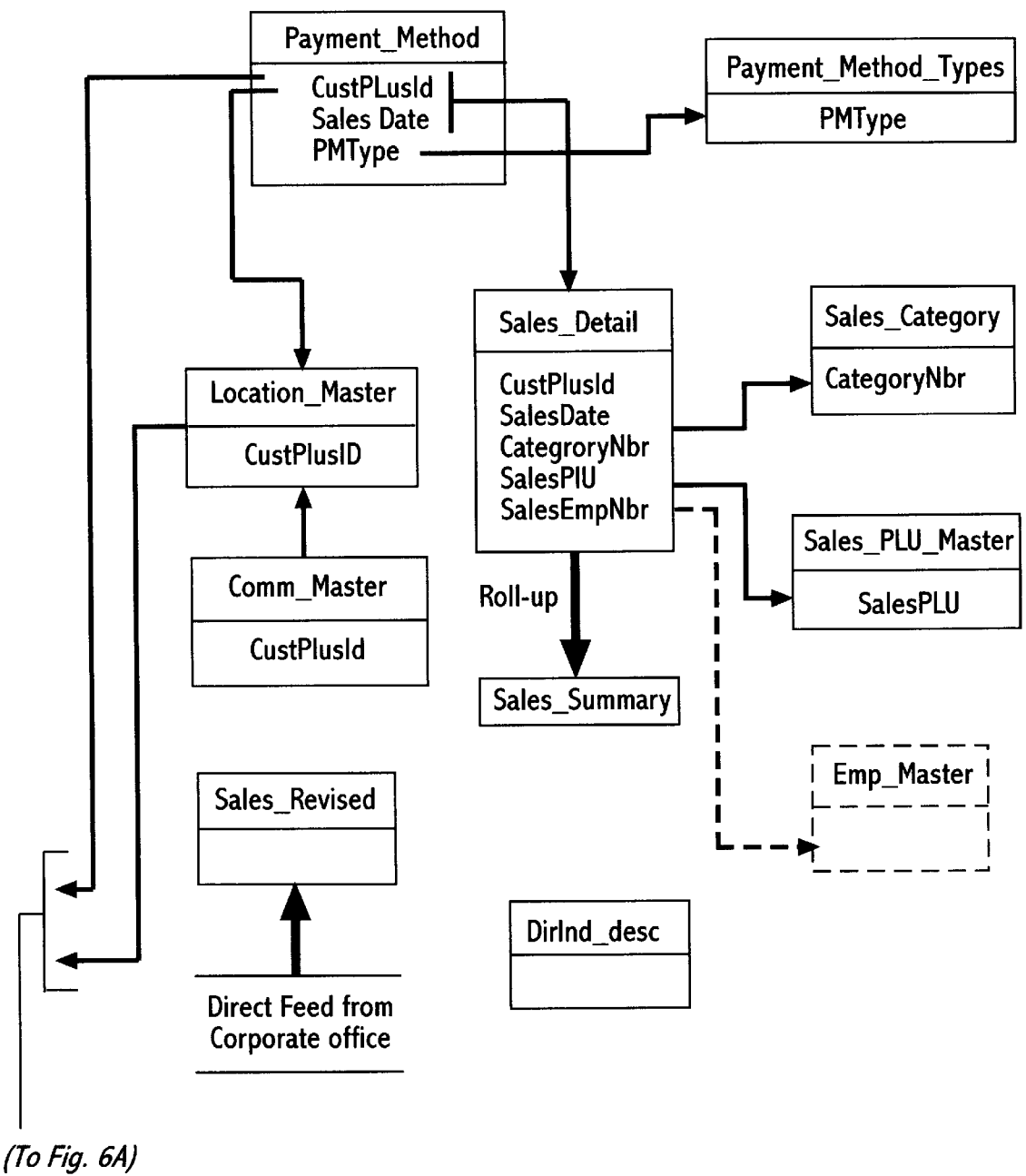

FIG. 1 shows an overview system diagram of one specific embodiment of the invention, with specific variations. FIGS. 2A and 2B show an example of operations and data flow for a system such as that shown in FIG. 1. FIG. 3 shows an example of operations and data flow for a customer service workstation operator. FIG. 4 shows an example of operations and data flow at a server. FIG. 5 shows an example database architecture for a high-end client on the service side. FIG. 6 shows an overview system architecture of a remote customer plus system according to a specific embodiment of the invention. Functions and various embodiments of the elements shown in FIG. 1 and the operations shown in FIGS. 2–6 will be discussed in more detail below.

Other Features of Specific Embodiments

Other features also may be included in specific embodiments of the invention, including: (1) Remote location collection of customer visit and POS transactional data; (2) End of day transmission of the data; (3) Translation and storage of data in membership & POS database (data warehouse); (4) Hard copy and on-line individual reports of membership information; (5) Hard copy and on-line reports on the frequency of customer visits; (6) Hard copy and on-line reports on sales information linked to customer visits; (7) Weekly and monthly transmission of summarized data back to customer sites for analysis.

Remote Data Collection POS Input

At the remote location, the system can be an existing DOS or Windows based POS device with a magnetic-strip reader or other input device to collect customer frequency information or, for locations without the adequate POS equipment, an external card reader with built in modem and printer may be installed. In cases where a credit card is used to identify customers, a device will be used to read an existing credit card, and only pick up the last several digits of the card number. The purpose for this is convenience to the customer, comfort level of security, used as the member identification number, and is a cost saving to users of the invention of not having to produce membership cards. The device prompts the user of the system for any requested information, stores the data and transmits to the host system on a daily basis. A small printer is attached to print a transaction receipt with membership information, date and time of visit, and points added. The communication link between the remote locations and host can be dial up phone service, sprintnet or telenet type service, T1.5 access, or dedicated line service all contingent upon client needs.

The host location may have a business class server, such as a HP or Compaq running under a Windows NT type operating system linking to external servers as required. On this network several client stations may be installed for membership maintenance, report generation, data analysis. Another similar server will be installed to handle the communications/transmission of information from remote locations. The Customer Plus data center will receive weekly POS data downloads from various client POS servers if required.

Use of One Embodiment of the Invention

The user of the remote data capture device will take input from an existing credit card, smart card, private label card, or biometric device and record the member identification. If the member does not have an input card, the screen can prompt the server to manually enter a member number. The screen can allow entry of the guest receipt number and total amount of receipt. Generally, the collected information will be stored on the POS device until at the end of the day, when the device batches and transmits the EOD file to the host network. The POS transactional data is transmitted to the host network and the combined data is used to correlate and provide relevant management reports.

ON-LINE and hard copy reports show the member record, member total visits, demographic information on multiple member access, and sales information by member; item sales mix and popularity, average spending by member detailed by components of a sales, etc.

Client Application

The primary functions within the client application can be categorized into four main areas: members, reports, administration, and help.

Members—These functions include adding and deleting members from the database, updating member information, supporting member requests for information and awards, and monitoring the progress of member transactions.

Reports—Accessing the databases and presenting the information in an understandable and useful format is a primary objective. Predefined reports and online queries against the database are important features of the embodiment.

Administration—These functions help the more technical user support the system's operation. For example, defining the levels of the restaurant hierarchy, setting up a new Customer Plus user, and defining the communication parameters are some of the options.

Help—In addition to the standard help content, Customer Plus has an added feature of automatically displaying field level "tips" based on the position of the cursor.

Member Management

There are three main functions in managing members: Updating Member Profiles; Member Transactions; and View Pending Requests.

Updating Profiles and Adding Members

The basic fields on the member screen include: first and last names, middle initial, addresses and phone number, primary phone/address flag, gender, marital status, Customer Plus ID, status and when assigned, join date and location, when the profile was last updated and by whom, current account data, family member ID, fax #, E-mail address, and last statement date. The first and last names generally are required fields (the Customer Plus ID is automatically assigned). Personal information is considered confidential and is kept secure. Screens containing confidential information are labeled as such.

A new member may be added by scanning in enrollment forms or by manually keying in the data. New members may identify the number they wish to use as their account number (i.e. credit card, frequent diner club, etc.) or need not identify a number of a unique card, smart card, or biometric input is used. If an ISO standard magnetic stripe is on the customer's card, then the card may be swiped in a reader. If needed, portions of the account number may be truncated for security purposes. Members may also sign up via a form with a pre-assigned number. The member completes the form and it is scanned in either at the remote location or at the service bureau.

The member ID where one is used must be unique. With preprinted forms and/or a user-selected card number, duplicates may occur in rare cases. The ID is verified to be unique when the record is created in the database. If a member has selected a number that is already assigned, then follow-up is necessary with the member to select an alternate number. When a member applies, a sticker may be used on the member's pre-existing credit card to help identify it as the one used for Customer Plus membership.

An existing member's profile may be displayed via wildcard searches on first name, last name (default), primary phone number, and member ID. Information not provided by the member is set to a default value and these members are printed on an exception list but are still added to the database. Two addresses are maintained in the database, home/personal and work/business. One address/phone number is identified as the primary contact data. A confirmation notice is sent to the member for any profile modifications as part of the periodic account statements. This may be done via E-Mail, fax or postal Mail.

Members who have not visited a location for a specified period of time may be automatically set to inactive. All changes to a member's profile and any associated transactions are logged in the database for auditing purposes. These logs may be viewed, archived and discarded as needed. Detail POS data is retained for a short period of time. Only the last transaction's detail is saved for display. Other POS data is archived. This is available from the member profile screen.

Member Transactions

"Floating" transactions (i.e. sales which do not have an assigned member ID) are automatically assigned to a non-member ID. The Customer Plus ID cannot be changed once it has been assigned. However, a merge function is provided to combine the points and transactions in the "from" account with the "to" profile. If there is any difference in rolodex information, the "to" profile's data is saved. The merge function also zeroes out the "from" account balances.

If a member calls to dispute the account total, then points may be adjusted accordingly. Both positive and negative points may be applied. A reason code is assigned to the transaction that indicates why the points were adjusted. Each option has a unique member transaction type. Based on the transaction type and status, the request is routed to a queue for follow-up. Transaction types need to be customized per a user depending on the specifics of the new type.

Catalog requests may be fulfilled at the remote location. Or, the request may be sent to the service bureau via Teleform. A member may also use a check box on the enrollment form to request a catalog. An award transaction contains the member ID, the PLU of the award, the quantity of the award, the award amount (i.e. "cost"), date/time of the transaction, who created it, and status (new, pending, fulfilled, shipped) and transaction number. When the award transaction is submitted, it is retained in a pending request queue for a short period of time before completing its processing. This is to easily permit cancellation by the user. Timer is configurable.

Members may call, fax, or mail in a form to redeem an award. To select an award, the customer service representative may highlight the appropriate item in a pick list or key in the PLU #. When an item is highlighted in the pick window, the brief description and required award points is displayed accordingly. The quantity is defaulted to 1. Documentation requests have a unique transaction type and may be teleformed in, too. Some awards may require customization such as monogramming. This information can be entered in the free-form text field.

If the user does not cancel the transaction, the data is sent to the appropriate fulfillment house via fax. Members who submit complaints, compliments and/or questions via the mailed in form or telephone are forwarded to the pending request queue for follow-up. If there are insufficient points when a member has already placed an award request, the request may be fulfilled depending on the discrepancy. If it is within a specified amount, the customer service representative may override the discrepancy. The amount is configurable by the client. Periodically, the documentation requests in the pending queue automatically print out a mailing list. The labels are applied to the catalog and mailed. How each queue is monitored and/or followed up is user dependent.

View Pending Requests

Pending requests contain the member ID, transaction type, date and time. The detail of the request may be viewed and the status updated. A comment field is also provided for free-form requests. The pending requests queue contains all requests requiring follow-up. These include complaints/compliments and initial submission of award requests. The queue is displayed in date/time order and by member. Only one queue may be displayed at a time. From the queue, the user may select the request to view the detail. Then, it may be forwarded as E-Mail or the member may be contacted or the appropriate person will be followed up. The user needs to update the request and change the status. An appropriate reason code is also selected.

Customer Analysis Report Writer

The invention may incorporate a base report writer tool for maximum flexibility and functionality. All standard features are retained. Only enhancements to the tool to meet CP requirements are described here. The responsibility of the report writer is to display and print the reports in various formats from a set of results data. Manipulation of the report presentation and modification to the content of the report is dependent on the selected tool. The user may choose a specific report from a scrollable list. Only one query may be selected at a time. As an additional enhancement, the Customer Plus service bureau may configure a client's specific set of predefined reports to be downloaded on a regular basis to identified locations. To run these reports, the user uses the specific results file(s) or has connectivity to the database. If the results file(s) are not available, the application will ask the user to confirm establishing access before attempting to run the queries. If access cannot be achieved, then an error message displays.

A summary of the report is always displayed on the screen while the query is being defined and after it is run as reference information for the user. This information includes: total number of locations, type of sales, start and end period, and any sort criteria. For example, "This current query is defined for # locations with $ sales from day1 through day2 sorted by X and Y and Z in low, medium, and high categories." Default formats for the report and mailing list outputs are provided for the report writer tool. Reports can be sent automatically to a fax program if the user has a fax communication program installed on the workstation. The run date is printed on all report formats.

The user specifies the query parameters: location(s), date range, day part (i.e. AM or PM), level (company vs. location) and usage (e.g. dollars spent) based on what is appropriate. See each report layout for specifics. Default values are also provided for the all selection criteria. Every query/report executed generates an ASCII results file from the database/server and transfers the results file to the user. This file may then be manipulated for different graphical output formats. If the user loses his/her connection from the database and is in an "offline" mode, then the only reports that may be displayed are those in which the result sets are already transferred to the user.

Mailing lists print the salutation, first name, middle initial, last name, address, city, state, zip/postal code, and country for each member for the selected label format. Separate mailing lists may be printed for high, medium and low usage categories. When one of the standard mailing lists are run, the following information is displayed on the screen: first name, middle initial, last name, total dollars spent since join date, total number of visits, average purchase amount per visit, address and phone number. The members are sorted into heavy, medium and light usage categories. The formatted output of the mailing list is the same as the displayed information. Thus, multiple result sets are created and transferred to the user. The report writer, therefore, may display multiple windows (one for each result set).

The following queries are available in which the mailing list output is applicable: Custom List, Birthday List, Sales Activity, Rolling 12-Month Trend, Promotion Analysis, and Join Date List.

Each usage category of members in the Custom List query may only be sorted at three levels for the printed output. The default is zip code, last name, and first name. Input criteria include: day part, day range, usage, zip code, location, ADI, gender, and marital status. The birthday list and sales activity list input parameters are: date range, day part, location, zip code, and usage. The join date list input criteria are: date range and location. It, too, is sorted by usage categories and ordered by last name, first name. The rolling 12-month trend requires location, date range, and day part for input. Output data includes: normalized sales (total less tax/gross sales less promotions/incremental sales) per month for the past year and current year, projected sales based on trends in the existing data. The current month is not included in the analysis.

The promotion analysis requires location, date range, and day part input. Gross, incremental and normalized sales, direct and indirect costs, and profit for the current year, prior year and difference is displayed. The costs may be keyed in by the user. A worksheet function is provided for direct and indirect costs to quickly total a series of numbers. The sales rollup/sales trend query can be run at any level of the company hierarchy/profile. Inputs are: fiscal year and number of fiscal reporting periods. This report cannot be export into a delimited file. The per-person average report displays the ticket average per person by location (i.e. purchase amount divided by total number of transactions) and average spending amount by sales category (e.g. entrees, desserts, appetizers, and beverages).

Labor productivity shows the total number of labor hours worked for certain job classifications divided by the total number of entrees by location for each week/period. The user inputs location, date range, period/week. The client must provide information regarding the labor hours for this report. For the product sales mix report, the user inputs location, fiscal year, last period date (e.g. week). The quantity of product sold by location, totaled for the period, and the percentage sold by food category is displayed. The new enrollments report compares the number of members joined for all locations. Trend analysis reports are based on a 12-month cycle. The standard reports are defined for 28-day calendars. Family level reports are also provided as needed. Customer frequency usage reports can be variously defined.

Group/Script Reports

There are predefined groups of queries that can be requested at one time by the user. The queries are the same as those available in on demand. The result data sets are returned as though each report was requested individually. Group1 includes: Sales Rollup, Per Person Average by Location, Labor Productivity, Product Sales Mix. Group reports require the specific results file(s) or online access to the database. If the file(s) are not available and the user does not have connectivity to the server, then a message is displayed asking the user if a connection can be established. If connectivity is not achieved, then an error message appears.

Administrative Functions

The invention includes a number of customer base administrative functions, many of which are similar to standard database functions, such as: Open Customer Base; Close Customer Base; Print Screen; Exit; Preferences; Options; System Administration.

Open Customer Base: A customer base is defined in Customer Plus as the member group. Member groups are tied to a particular customer frequency/loyalty program. Only one customer base can be open at a time. The customer base name is displayed on the title bar next to "Customer Plus".

Close Customer Base: When a customer base is opened for viewing and maintenance, it may be closed without shutting down the Customer Plus session (i.e. the user does not need to sign on again). The close "gracefully" ends any processes, which may include database connectivity, to minimize data corruption. When a customer base is closed, the majority of the menu functions are unavailable. Only open customer base, exit, print screen, and help are active. The close customer base function leaves the user at the main menu.

Preferences: The toolbar is user customizable. Its intent is to provide the user with graphical images that execute functions also available in the main pull down menus.

Options: The options features include the following: Default Communication; MSR Manual Poll; Location; Company Calendar; Hierarchy; Menu Security. Also included are several ADI Access functions, such as: Inactive Member Flag; Status, Delete, Reason Codes; Request Statuses; Priorities; Award Cancellation Period; Detail Data Retention.

The company hierarchy can be defined with a maximum of five levels. For example, they may be company, division, region, district and location. Each level of the company hierarchy is user defined (i.e. the name of each level). For each hierarchy level, every instance is defined with the following fields: name, CP ID (system generated), customer specific ID, address, main phone number, contact name and title, fax number, computer phone number, MSR phone number, two alternate phone numbers, type of sales (AM, PM, both), status code (e.g. poll, no poll, active, inactive), delete code, description, opening date, closed date, who created the profile in CP and when, the date of its last update and by whom, and comments. In a current embodiment, a maximum of 10,000 locations may be defined per customer base. The user must link the lower level instances to its parent hierarchy level. Any instance may only have one parent level.

Security: Customer Plus offers a highly customizable security system. Every function can be assigned a minimum security access level (1–10). This information is saved in a local configuration file. A user ID defines what access level the user has to the menu functions and which customer bases may be opened. Each access level may be assigned a label for ease of use in setting up user IDs. Defaults are provided for a five level structure: End user; Customer representative; Supervisor; System administrator; CP developer. Anyone accessing CP requires a login ID and password. Each sign-on ID is assigned to a specific security level. A sign on screen is required for the user to key in an alphanumeric ID and hidden password. At the time of sign on, the user selects the connectivity method to the database (e.g. remote dial-up, direct LAN connection, etc.). Connectivity may also mean an "offline" mode so that any report ASCII result sets can still be displayed by the user. Once connected, the user is given access only to those customers configured with their sign on ID. A default communication method may be configured for the specific machine.

Status codes (for queues, hierarchy levels, members), delete codes (for members, hierarchy levels), reason codes (queues), and priorities (queues) are all customizable. A grace period may be defined for members to cancel their award transactions without any penalty. Detail polled transaction data may be retained for a specified period of time.

System Administration: Primary system administrative level functions are: Create a New User; Reset Password; New Customer Base; Delete Customer Base; Auto Open Customer Base Default and Path; Database Security; System Maintenance Tools; Reactivate Company; Exception Reports; Backup; View and manage logs.

A number of exception reports are provided to indicate the level of system performance. These include: processing time, data records that did not meet standards, missing location data, etc.

Configuration of this specific client to the server (i.e. whether through a dial-up communications mode) is set up in this option. There are several system generated exception reports to help maintain the system. These include: Discrepancies in the periodic audit between corporate finance/accounting system; members who did not provide any address information; members who have a minimum number of transactions/changes; duplicate members; pending requests for a specific status open a particular length of time; system level error reports. When an item is set to an inactive status, lower level relationships are removed.

Help Features: An incremental search feature is needed for the user to look up key words in the index. As a user keys in letters, the listed topics continues to update according to the input for a drill down effect. A brief "tip"/instruction statement is displayed when the cursor position is at a data entry field and/or field label. A contents/index listing is also provided for general topic identification. An "about CP" information window is provided.

Reports and Queries

The standard set of reports and queries that may be included with the invention include: Output; Generic Ledger; Spreadsheet Net Sales; Ticket average; Food counts; Net dollars; Labor costs; Executive Summary; Sales and Ledger Summary; Per Person Average Spending; Area Labor Analysis Project hours; Actual hours; Daily Labor by Employee (Time and Attendance Pay rate; Time in/out; Hours; Labor costs; Key Indicators; Product Sales Mix Quantity of food item; % of entrees; Food Bar Costs; Ticket Average Quantity sold; Dollars sold; Labor Productivity Meal counts; Sales; Minutes per meal; Company Sales Rollup Net sales; Labor costs; Custom List; Birthday List; Sales Activity; Rolling 12 Month Trend; Promotion Analysis; Join Date List; New Enrollments.

User Interface/POS Module—Specific Embodiment

FIGS. 7 through 20 show various specific example input and display screens that can be used to allow a user to interact with the invention. Not all screens discussed below are shown, in some cases, screens not shown are more simple input screens with many possible variations. One specific embodiment of the invention is referred to herein as the Customer Plus System.

Customer Plus Welcome Screen

The Customer Plus system greets the user with the Customer Plus Welcome screen and generally can display a company name and logo and possible various hot information, such as ads or company specials. There are ten options presented on a menu; File; Logon; Search; Summary; Update/View; Notes; Preferences; Print Tip Card; Admin; Help; The file menu allows the user to set up basic program configuration and to exit the system. The Search, Summary, Update/View, Notes, Preferences, Print Tip Card, and admin options are disabled menu items on this screen. The user may select the Logon option from the menu to display a logon screen. When the user selects the Logon option from the menu bar, the Logon screen will appear, requesting a user identification and password. The users then type their identification number and their password. The users may then press Logon and the Search screen will appear. Press Cancel and the screen will close. Alternatively, the user may log on to the system using any other form of identification, such as a smart card, voice recognition, or biometric recognition.

Customer Plus Search Screen

When the user selects the Search option on the menu, the Search screen will appear. To search for a member, the user must key in the member's identification number. If the user does not know the member's identification number, then the user may key in the last name, first name, middle name, and then press the Find button to initiate a search. All matching records will be displayed in the Results field, as shown in FIG. 7. The Sounds Like button has been provided to give the user greater flexibility. If the user is not sure of the correct spelling of the member's name, the user may press the Sounds Like button and a phonetic search will be initiated. The member's information will be displayed in the Results field. The user may select the appropriate record and then select the UpdateView option or the Notes option on the menu. The member's record will be displayed on the UpdateView screen or on the Notes screen. The user may click on the Include Inactive Member Members field to include both active and inactive members in the search.

Customer Plus Summary Screen

When the user selects a record on the Search screen and then selects the Summary option on the menu, the Summary screen as shown in FIG. 8 will appear and the selected member's information is displayed. The user may exit the Summary screen by selecting another menu option.

Customer Plus Member Update/View Screen

Figure 9:
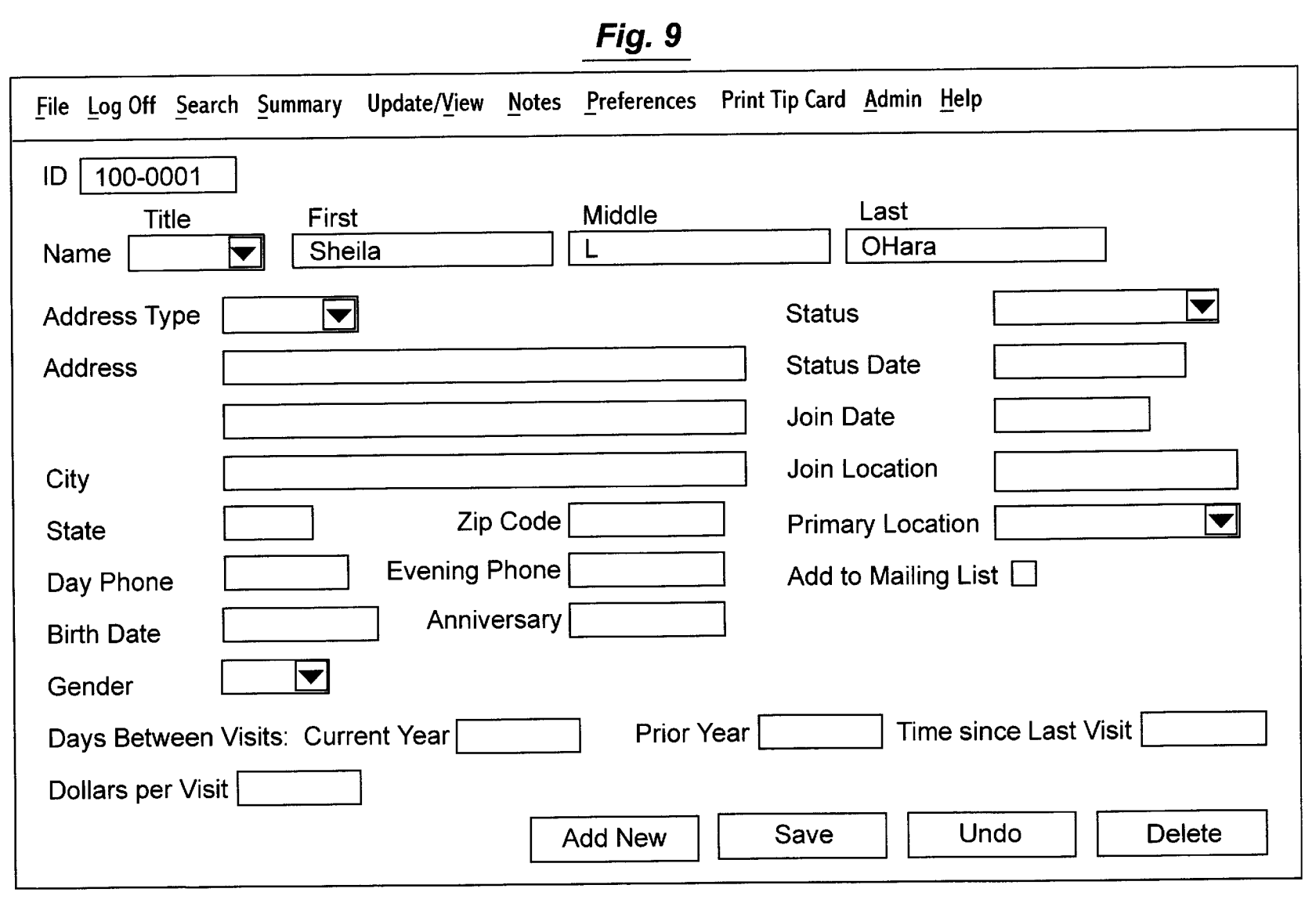

When the user selects Update/View from the menu the Update/View screen, FIG. 9, appears. This screen facilitates the user in adding new members, updating existing member's information, and removing member information. To add new members or to update existing member's information, the user types in the member's information in the shaded or colored fields. Colored or shaded fields are required fields. Information is required in the following fields to create a new member in the Customer Plus system. Name (First, Middle, and Last; Address Type (Home or Work); Address; City; State; Join Date.

To enter the new member information into the system the user presses the Add New button. The user may press the Undo button to clear the screen of information. To update a member's information, the user enters the member's information and then presses the Save button. The user may delete a member's information by pressing the Delete button. The Delete button should only be used to delete member information that has accidentally been entered.

Customer Plus Member Notes Screen

When the user selects the Notes option from the menu the Notes screen, FIG. 10, appears. Information about the member's dislikes and special needs may be entered. The user types in the member's identification number (required information indicated by yellow field).

Customer Plus Member Preferences Screen

When the user selects the Preferences option from the menu, the Preferences screen, FIG. 11, appears. The user may enter members preferences in the following fields.; Server; Room; Table; Other fields to be defined by the user. The ID field is the only required field on this screen.

Customer Plus Record Visit Screen

When the user selects the Record Visit option from the Admin menu, the Record Visit screen, FIG. 12, will appear. The user will record the member's visit and sales information. The following member information will be required: Sale date and time of a member's visit; Sales transaction identification number; Server identification number; Amount of member's transaction; Time of member's visit (AM or PM) The user may also record the member's points, although this field will not be required.

Customer Plus Store Information Screen

When the user selects the Setup option on the File menu, the Store Info screen, FIG. 13, appears. This screen facilitates the user in adding new store information. To add new store information the user types the store's information in the following fields: Store ID; Store Name; Address; City; State; Zip; Phone; Fax. Pressing Save will store the information and the next time the user selects the Store Information screen this information will be displayed.

Customer Plus Import Screen

When the administrative user selects Import on the Admin menu, the Customer Plus Import screen will appear. The screen will display the default path and file name. The user will then verify that the path and file name are correct. Pressing OK will import the data from the main office and pressing Cancel will return the user to the previous screen.

Customer Plus Export Screen

When the administrative user selects Export on the Admin menu, the Customer Plus Export screen will appear. The user will select New Record to export only records that have not previously been stored, or the user will select Whole Database to export the complete database. The user will then press OK to export the data to the main office. Cancel will return the user to the previous screen.

Customer Plus User Maintenance Screen

When the administrator selects the User Maintenance option from the menu, the User Maintenance Screen, FIG. 14, will appear. The administrator will be presented with a screen that will provide the following fields: ID; Password; User Name; User Type; Status (active or inactive).

Customer Plus Reports

When the user selects the Reports option on the menu, the Reports menu will display six report options.; Usage; Birthdays; Member Join Dates; Sales Activity Comparison; Transaction Log; Print Mailing Labels Usage Report When the user selects Usage Report from the Reports menu the Run Report window will appear. The Usage Report, FIG. 15, will list the total number of member visits and the amount of each sale.

Birthday Report

When the user selects the Birthday Report from the Reports menu the Report Date Select window will appear. The Birthday Report, FIG. 16, will list members using birth dates as the selection criteria.

Member Join Date Report

When the user selects the Member Join Date Report from the Reports menu the Report Date Select window will appear. The Member Join Date Report, FIG. 17, will list members using the member's join dates as the selection criteria.

Other reports, such as a Sales Activity Comparison Report, may also be made available to the user.

Transaction Log

When the user selects the Transaction Log from the Reports menu the Transaction Log, FIG. 18, window will appear. The Transaction Log will list recorded sales. The user will use this report to audit the data verifying that the data has been entered correctly. The selection criteria will be date range.

Print Mailing Labels Report

When the Print Mailing Label option is selected on the Report menu, the Print Mailing Labels window, FIGS. 19A and 19B, will appear. According to the label type selection, different input fields will be displayed. An options window to facilitate printing a mailing label, which will include name, address, city, state, and Zip code and label size or format will appear. An example Printout of Mailing Labels is shown in FIG. 20.

What is claimed is:

1. A method for identifying a customer for administering a customer frequency, analysis, and reward system comprising:

obtaining from a customer customer identifying information such as name, address and phone number;

selecting a customer identification means, said means not requiring assignment of a new customer identification number; and using said customer identification means to record customer transactions details in a database local to a point-of-sale location.

2. A method for identifying a customer for administering a customer frequency, analysis, and reward system comprising:

obtaining from a customer customer identifying information such as name, address and phone number;

selecting a customer identification means, said means not requiring assignment of a new customer identification number; and using said customer identification means to record customer transaction details in a database local to a point-of-sale location, said customer identification means being a means that the customer would normally use to complete customer transactions, such as a pre-existing checking account number, or a pre-existing credit card number.

3. The method according to claim 2, wherein a sticker or other marking device is used on a pre-existing credit card to identify that credit card as containing the customer identification means.

4. The method according to claim 2, wherein the customer identification means is a subset of numbers from a credit card in order to provide for enhanced security.

5. The method according to claim 2, wherein a number of different customer identification means may be used to identify a single customer profile.

6. A customer frequency, analysis, and reward system administered by a first entity comprising:
- a point of sale (POS) data collection device capable of inputting POS customer transaction data, including a customer profile ID, wherein the POS data collection device is configured to identify a customer with a number previously assigned to the customer by an unrelated second entity;
- a local database closely coupled to the point of sale device for storing customer profiles;
- a central data warehouse, periodically updated by data in said local database, for storing all customer profiles and transaction details from a number of POS local databases;
- a set of analytical information tools, with access to said data warehouse, for performing customer frequency and transaction analysis and generating meaningful information including spending trends and customer frequency; and
- a customer loyalty reward system, with access to data in said data warehouse, for maintaining information regarding customer frequency in order to provide an awards program as an incentive for a customer participating in said customer analysis system.

\* \* \* \* \*